(12) United States Patent
Davidovics et al.

(10) Patent No.: US 11,299,425 B2
(45) Date of Patent: Apr. 12, 2022

(54) COMPOSITE MATERIAL COMPRISING A FIBROUS REINFORCEMENT AND A POLY(PHOSPHO-SIALATE) GEOPOLYMER MATRIX AND ASSOCIATED MANUFACTURING METHOD

(71) Applicant: PYROMERAL SYSTEMS, Barbery (FR)

(72) Inventors: Michel Davidovics, Pont Sainte Maxence (FR); Joseph Davidovits, Saint Quentin (FR); Magali Batut-Rollin, Fresnoy le Luat (FR)

(73) Assignee: PYROMERAL SYSTEMS, Barbery (FR)

( * ) Notice: Subject to any disclaimer, the term of this patent is extended or adjusted under 35 U.S.C. 154(b) by 0 days.

(21) Appl. No.: 17/051,136

(22) PCT Filed: Apr. 15, 2019

(86) PCT No.: PCT/IB2019/053067
§ 371 (c)(1),
(2) Date: Oct. 27, 2020

(87) PCT Pub. No.: WO2019/211686
PCT Pub. Date: Nov. 7, 2019

(65) Prior Publication Data
US 2021/0230068 A1    Jul. 29, 2021

(30) Foreign Application Priority Data

Apr. 30, 2018    (FR) .................... 18 70508

(51) Int. Cl.
| | | |
|---|---|---|
| *C04B 28/00* | (2006.01) | |
| *C04B 35/18* | (2006.01) | |
| *C04B 35/447* | (2006.01) | |
| *C04B 35/80* | (2006.01) | |
| *C04B 14/46* | (2006.01) | |
| *C04B 20/00* | (2006.01) | |
| *C04B 28/34* | (2006.01) | |

(52) U.S. Cl.
CPC ........ *C04B 28/006* (2013.01); *C04B 14/4625* (2013.01); *C04B 20/0048* (2013.01); *C04B 28/342* (2013.01); *C04B 35/18* (2013.01); *C04B 35/447* (2013.01); *C04B 35/80* (2013.01)

(58) Field of Classification Search
CPC ... C04B 14/386; C04B 14/42; C04B 14/4625; C04B 14/4631; C04B 14/4656; C04B 14/4693; C04B 20/0048; C04B 28/006; C04B 28/342; C04B 35/18; C04B 35/80; C04B 35/82; C04B 35/447; C04B 40/0268; C04B 2235/447; C04B 2235/3217; C04B 2235/3218; C04B 2235/3244; C04B 2235/3463; C04B 2235/5224; C04B 2235/5228; C04B 2235/5232; C04B 2235/5248; C04B 2235/616; C04B 2235/96; Y02P 40/10
See application file for complete search history.

(56) References Cited

U.S. PATENT DOCUMENTS

2014/0053493 A1    2/2014    Carey

FOREIGN PATENT DOCUMENTS

| | | |
|---|---|---|
| EP | 0 288 502 B1 | 7/1991 |
| WO | 91/13830 A1 | 9/1991 |
| WO | 91/13840 A1 | 9/1991 |
| WO | 96/28398 A1 | 9/1996 |

OTHER PUBLICATIONS

Wang et al., "Microstructure and oxidation resistance of C-AlPO4-mullite coating prepared by hydrothermal electrophoretic deposition for SiCC/C composites," Ceramics International, Mar. 2013, pp. 1037-1044, vol. 39. No. 2.
Yang et al., "Fabrication and Properties of SiO2/Zirconium Phosphate-B2O3—SiO2 Anti-oxidation coatings for Cf/SiC Composites," Ceramics-Silikaty, 2015, pp. 233-237, vol. 59, No. 3.
Joseph Davidovits, "Phosphate-based Geopolymers," Geopolymer Chemistry & Applications, 2015, Chapter 13, 4th Edition.
Bortnovsky et al., "Properties of phosphorus-containing geopolymer matrix and fiber-reinforced composite," Ceramic Engineering and Science Proceedings, Dec. 2009, pp. 283-299, vol. 30.
Opalinska et al., "Size-dependent density of zirconia nanoparticles," Beilstein J. Nanotechnol., Jan. 5, 2015, pp. 27-35, vol. 6.
"Phase Diagrams for Ceramists, Figure 364," Metal Oxide System, 1964, p. 142, American Ceramic Society.

*Primary Examiner* — Anthony J Green
(74) *Attorney, Agent, or Firm* — Im IP Law; Chai Im; C. Andrew Im

(57) ABSTRACT

A composite material containing a matrix and a fibrous reinforcement, in particular a textile embedded in the matrix. The matrix includes a geopolymer of the poly(phospho-sialate) type having the following formula I: (1) (—P—O—Si—O—Al—O—)$_n$, in which n is greater than 2. The matrix further includes zirconium covalently bonded to the matrix, especially in the —ZrO form and/or in the —O—Zr—O form. The matrix has a melting temperature greater than 700° C., especially equal to or greater than 1200° C.

16 Claims, No Drawings

COMPOSITE MATERIAL COMPRISING A FIBROUS REINFORCEMENT AND A POLY(PHOSPHO-SIALATE) GEOPOLYMER MATRIX AND ASSOCIATED MANUFACTURING METHOD

RELATED APPLICATIONS

This application is a § 371 application of PCT/IB2019/053067 filed Apr. 15, 2019, which claims priority from French Patent Application No. 18 70508 filed Apr. 30, 2018, each of which is incorporated herein by reference in its entirety.

TECHNICAL FIELD

The present invention relates to a composite material comprising a fibrous reinforcement and a geopolymeric matrix of the phospho-sialate type and the process for manufacturing the composite material.

More specifically, the present invention relates to a thermo-structural composite material comprising a reinforcement of fibers, which may be of ceramic type, and a mineral geopolymer matrix.

BACKGROUND OF THE INVENTION

Thermo-structural composite materials retain their mechanical properties (tensile strength, flexural strength, modulus of elasticity, in particular) during their use at high temperatures above 1000° C., or even above 1200° C., for several tens of hours of use, or even for several hundreds of hours of use. In a thermo-structural composite material, a distinction is made between the fibrous reinforcement which forms the skeleton of the composite material and partly supports the stresses, and the matrix which ensures the cohesion of the composite and protects the reinforcement from oxidation. If at a given temperature, the matrix prevents oxidation of the reinforcement, it can be deduced that at this temperature, the mechanical properties of the composite will be maintained, at least for a period of several tens of hours.

Composite materials consisting of a ceramic fiber reinforcement and a geopolymer matrix are already known in the prior art. Thus, document EP 0 288 502 describes fiber-reinforced composite materials comprising a geopolymer matrix that involves a poly(sialate) M(-Si—O—Al—O—) geopolymer, obtained by alkaline synthesis. Composite materials containing these alkaline poly(sialate) geopolymer matrices, especially those containing carbon fibers, are generally used in fire protection applications. It is a matter of fact that above the temperature of 424° C., the carbon oxidizes in air, and the mechanical resistance of the reinforcement decreases significantly. This phenomenon is well known in the prior art as can be read in WO 91/13830, WO 91/13840 or WO 96/28398.

It is known that, in order to obtain a heat-stable composite material, carbon fiber can be specially treated with vapor deposition (silicon carbide or silicon nitride vapor), electrophoresis and other techniques, or to use a silicon carbide SiC fiber reinforcement. However, SiC fiber or special anti-oxidation treatments are very expensive, which limits their applications. Moreover, even in the case of the use of SiC fiber, composite materials with alkaline geopolymer matrices have a limited service life of a few tens of hours at 1000° C. Beyond this time, carbon oxidation occurs and continues and eventually induces a deterioration of the mechanical properties. Instead of these carbon-based fibers, silica fibers or alumina fibers can be used. However, here again, the alkaline poly(sialate) matrix is not suitable, because the cations ($K^+$ or $Na^+$) contained in these alkaline geopolymers are too reactive and react with the fibers. As a result, composite materials comprising an alkaline poly(sialate) matrix and alumina or silicon fibers possess properties that make them incompatible with some applications; they break easily especially when used at high temperature, i.e. at a temperature of at least 1000° C.

The use of carbon-based fibers (C or SiC) is often preferred for their specific physical properties. This is why the prior art proposes many ceramic-based systems to protect the fibers of these composites from oxidation at high temperature. For example, the paper entitled "Microstructure and oxidation resistance of C—$AlPO_4$-mullite coating prepared by hydrothermal electrophoretic deposition for SiC—C/C composites", by Kai-Tong Wang, Li-Yun Cao, Jian-Feng Huang, Jie Fei and Bo-Ye Zhang, published in the journal Ceramics International, 39 (2013), page 1037-1044, describes a process in which $AlPO_4$-cristobalite powder is prepared at 1400° C., this powder is diluted with isopropanol, and the resulting mixture is applied to a silicon carbide SiC fiber fabric by electrophoresis in an autoclave and oven.

The article entitled "Fabrication and Properties of $SiO_2$/Zirconium Phosphate-$B_2O_3$—$SiO_2$ Anti-oxidation coatings for Cf/SiC Composites", by Xue-Jib Yang, Yu-Di Zhang, Chang-Rui Zhang and Bin Li, published in Ceramics-Silikaty, 59 (3), pages 233-237, in 2015, describes a process in which the first step consists of preparing powders of $SiO_2$, zirconium phosphate, $B_2O_3$—$SiO_2$, mixing these powders and dispersing them in an organic resin (generally of the phenolic type). Then the textile is impregnated with this organo-ceramic matrix, dried and consolidated by sintering at 1200° C.

In these two techniques, the composite parts are small due to the tooling required to obtain the sintering temperature.

Although the technological development of geopolymers has focused mainly on the geosynthesis in alkaline medium, some geopolymers obtained in acidic medium are known. These are essentially based on syntheses involving the chemical reaction with phosphoric acid $H_3PO_4$. These reactions are described in Chapter 13 entitled "Phosphate-based Geopolymers" of the reference book "Geopolymer Chemistry & Applications" by Joseph Davidovits (2008-2015), published by the Geopolymer Institute, 3rd ed. ISBN 978-2-9514-8205-0 (2011) and 4th ed. ISBN 978-2-9514-8209-8 (2015). This book describes two types of acid phosphate geopolymers:

a) poly(phospho-siloxonate)
b) poly(alumino-phosphate) (—Al—O—P—O—)$_n$, $AlPO_4$ and its different structural forms, $AlPO_4$-berlinite and $AlPO_4$-cristobalite.

The chemical reactions between phosphoric acid and silica $SiO_2$ on the one hand, and alumina $Al_2O_3$ on the other hand, are used in the production of refractory materials. In general, a solution of phosphoric acid is mixed with quartz ($SiO_2$) or alumina ($Al_2O_3$) aggregates. Then it is compacted in a mold, demolded and dried at a temperature below 100° C. Finally, the material is heated to a sintering temperature of approx. 1200° C.

As mentioned in the reference book cited above, much research has been done on the formation of the poly(alumino-phosphate) (—Al—O—P—O-)n geopolymer, whose unit has the empirical formula $AlPO_4$, from an oxide-alumino-silicate, generally referred to as metakaolin MK-750. This is a mineral that is highly reactive with phosphoric acid. Indeed, like all acids, it acts by de-alumination of the alumino-silicate structure and immediately forms the aluminum phosphate $AlPO_4$ and leads to the separation of the poly(siloxo) phase (Si—O—Si—O). Metakaolin MK-750 reacts with phosphoric acid to form a ceramic-like mass exhibiting the $AlPO_4$-cristobalite structure, along with silica $SiO_2$, but no poly(phospho-sialate) acid (—P—O—Si—O—Al—O—)$_n$ geopolymer is formed. In addition, it is very difficult if not impossible to impregnate a textile reinforcement with this ceramic-like mass because it has a very high viscosity and large particle size. Scanning electron microscope, SEM, analysis shows the presence of dense particles with dimensions greater than 20 microns, generally of the order of 50 microns, which cannot penetrate between the fibers of the textile. This compound based on MK-750 can therefore not be taken into account in the preparation of textile-fiber-reinforced composite materials in particular textile fabrics-based. Indeed, the workers in the field know that in order to obtain fiber-reinforced composite materials with high mechanical and thermal performance, the matrix has to properly impregnate the fabric.

In addition, the article by Oleg Bortnovsky and et al., entitled "Properties of phosphorus-containing geopolymer matrix and fiber-reinforced composite", published in Mechanical Properties and Performance of Engineering Ceramics and Composite IV, edited by Dileep Singh and Waltraud M. Kriven, The American Ceramic Society in 2010, describes composites that include a textile and an alkali type geopolymer matrix of the general formula $(SiO_3)$ $K_xH_yPO_4$. This matrix has a melting temperature above 700° C. The composites obtained by using this matrix do not expand at temperatures of the order of 550° C. This geopolymeric matrix does not contain aluminum. It comprises a crystalline zirconium oxide phase which comes from the raw materials but the zirconium oxide is not covalently bound to the polymeric network of the matrix.

OBJECT AND SUMMARY OF THE INVENTION

The purpose of the present invention is to propose a method of manufacturing a fiber-reinforced composite which allows to obtain composite materials having ceramic and refractory properties, at temperatures lower than 1200° C., and in particular lower than 750° C.

Another purpose of the present invention is to propose a new composite material whose matrix reduces the degradation/oxidation of the fibers of the carbon-based fibrous reinforcement, even at temperatures of 1000° C. or more.

Another purpose of the present invention is to propose a composite material with fibrous reinforcement which has a 3-point bending strength (measured according to the indicated standards) and/or a tensile strength greater than or equal to 160 MPa.

Another purpose of the present invention is to propose a process for manufacturing a composite material as described above which allows the manufacture of very large parts having a surface area of several square meters.

Another purpose of the present invention is to propose a composite material which has substantially constant mechanical properties, in particular with regard to the 3-point bending strength according to the standards indicated in the application and/or the tensile strength (also measured according to the standards indicated in the application) even when used at temperatures of the order of 800° C., 1200° C. or 1600° C.

In order to remedy all or part of the disadvantages associated with the aforementioned prior art, the present invention proposes a composite material containing a matrix and a fibrous reinforcement, in particular a textile, embedded in the said matrix. More specifically and according to the invention said matrix comprises a geopolymer of the poly(phospho-sialate) type having the following formula I: (I) (—P—O—Si—O—Al—O—)$_n$ in which n is greater than 2, said matrix further comprises zirconium covalently bonded to said matrix, in particular in the form —ZrO and/or in the form —O—Zr—O and the said matrix has a melting temperature greater than 700° C., in particular equal to or greater than 1200° C.

One must put to the applicant's credit that it has shown that the above-mentioned matrix possesses a melting temperature which is the result of the presence of zirconium. This high melting temperature means that when the composite is used at temperatures below its melting temperature, the matrix remains in the geopolymer state and does not vitrify. The matrix has little or no reaction with the fibers of the fiber reinforcement and/or prevents their oxidation by oxygen from the air. In this way, the mechanical properties of the composite, in particular its tensile strength (measured according to the indicated standards) and/or its 3-point bending strength (measured according to the indicated standards) decreases only slightly (5% or less) depending on the temperature at which the composite is used.

The composites of the invention have very high mechanical properties, in particular in terms of tensile strength and/or 3-point bending strength. They are also thermally stable, from a thermal, chemical and mechanical point of view, and can be used at temperatures up to 1200° C., depending on the nature of the fibers of the textile, during operating times of several hundred hours, or even up to 1600° C. for shorter operating times.

Under a specific method of preparation, the said geopolymer matrix corresponds to the following raw formula II: (II) $wSiO_2:Al_2O_3:xP_2O_5:yZrO_2$ in which: "w" is equal to or greater than 1.00 and equal to or less than 3.00; "x" is equal to or greater than 0.20 and equal to or less than 2.00; "y" is equal to or greater than 0.02 and equal to or less than 0.30.

The indicated molar contents in zirconium oxide result in a matrix which possesses a melting temperature as described above while keeping the cost price of the composite at a reasonable level.

According to a mode of preparation that can be combined with any of the above-mentioned modes of preparation, the geopolymer matrix includes or consists of a nanocomposite, which includes or consists of three phases:
  a) a first polymeric phase, which essentially comprises or consists of said acidic poly(phospho-sialate) geopolymer of formula (1) and a micronized filler of $Al_2O_3$ type,
  b) a second nodular phase consisting of nano spheres of amorphous silica $SiO_2$ having a diameter of less than 2 microns, preferably less than 500 nm, and
  c) a third phase comprising units of formula —Si—O—(P—O—Zr—O—P—O)—Al—O— and units of formula —Si—O—(P—O—Si—O—Al—) and serving as a cross-linking site between said first polymeric phase and said second nodular phase.

The third phase, which forms a network around the two others, ensures the cohesion of the matrix and allows it to have a high melting temperature. The more units of the formula Si—O—(P—O—Zr—O—P—O)—Al—O— are present in the third phase, the higher the melting temperature of the matrix.

The said geopolymer with the formula (1) can also include a poly(alumino-phosphate) geopolymer (—Al—

O—P—O) having the empirical formula AlPO$_4$ of the berlinite type and/or a poly(alumino-phosphate) geopolymer (—Al—O—P—O) having the empirical formula AlPO$_4$ of the cristobalite type.

According to a specific method of preparation, said matrix also contains zirconium phosphate (P—O—Zr—O—P—O)—, present in said first phase. This zirconium phosphate which is not bound to silica comes from the reaction of the zirconium oxide bound to the ZrO silica particles with phosphoric acid. It is preferable for the matrix to contain as little zirconium phosphate as possible because this species decreases the —Si—O—(P—O—Zr—O—P—O)—Al—O— geopolymer content of the third phase. Thus, the first phase will preferably comprise said acidic poly(phospho-sialate) geopolymer of formula (1) and a micronized Al$_2$O$_3$ type filler.

The number of units having the formula —Si—O—(P—O—Zr—O—P—O)—Al—O— depends in particular on the zirconium oxide content found in the formulation used to produce the matrix. Thus, according to a specific method of preparation, which can be combined with any of the above-mentioned methods of preparation, the molar fraction "z"= (number of moles of zirconium phosphates in the said third phase)/(number of moles of SiO$_2$ in the matrix) is equal or greater than 0.02 and equal or less than 0.3 and in particular is equal to (y). The term phosphate refers to all types of phosphate that can bind to the Zr atom, namely H$_2$PO$_4^-$, H$_2$PO$_4^{2-}$ and PO$_4^{3-}$. As seen previously, zirconium phosphates can be included in the polymer of the third phase or in the form of zirconium phosphate, present in the first phase. When "z" has a value as mentioned above, the third phase contains more units of the formula —Si—O—(P—O—Zr—O—P—O)—Al—O— than units of the formula Si—O—(P—O—Si—O—Al—). The melting temperature of the matrix is thus increased significantly.

When "z" is less than 0.025, the matrix is not sufficiently doped with zirconium oxide; it follows that the geopolymer of said third phase contains more units of the formula —Si—O—(P—O—Si—O-Al-) than units of the formula —Si—O—(P—O—Zr—O—P—O)—Al—O—. The melting temperature of the matrix of this type of composite is lower than that of composites whose matrix contains more units of the formula —Si—O—(P—O—Zr—O—P—O)—Al—O—; such materials are nevertheless useful in some applications and do have a matrix whose melting temperature is higher than 700° C. and higher than the temperature of the post-curing stage of their manufacturing process, such as described in this patent application.

The choice of the fibrous reinforcement type is not limited according to the invention. It can be made of fibers dispersed in the matrix or made of a textile, knitted, woven or non-woven fabric.

The fibrous reinforcement will advantageously be a fabric.

The fibrous reinforcement can be a textile, in particular a fabric chosen among the textiles comprising/consisting of fiber(s) chosen among the aluminosilicate fibers, in particular alumina fibers, glass fibers, silica fibers, silicon carbide fibers, carbon fibers, graphite fibers and mixtures of two or more of these fibers.

The applicant has in fact demonstrated that the matrix of the composite of the invention protects the carbon fibers from oxidation and does not react chemically with the alumina and silica fibers, even at temperatures of the order of 1,000° C.

The present invention also relates to a method of manufacturing a fiber-reinforced composite material, according to which, in a characteristic manner:
- a resin is prepared by mixing, at a temperature substantially equal to 20° C., phosphoric acid H$_3$PO$_4$, alumina hydroxide Al(OH)$_3$, amorphous nodular silica SiO$_2$ bearing on its surface zirconium oxide, in particular in the form Zr—O— and/or —ZrOH, and water H$_2$O in the following molar ratios: P$_2$O$_5$/SiO$_2$ equal to or greater than 0.20 and equal to or less than 0.66; SiO$_2$/Al$_2$O$_3$ equal to or greater than 1.0 and equal to or less than 3; P$_2$O$_5$/Al$_2$O$_3$ equal to or greater than 0.20 and equal to or less than 2 and leaving the obtained mixture to stand for 1 to 2 hours;
- a textile is impregnated with said resin and consists of or comprises fibers selected among aluminosilicate fibers, including alumina fibers, glass fibers, silica fibers, silicon carbide fibers, carbon fibers, graphite fibers and mixtures of at least two of these fibers;
- a composite material is prepared by curing the textile impregnated with the resin at a temperature above 80° C., preferably above 118° C. and below 260° C., in an autoclave and under vacuum;
- said composite material obtained in the preceding step is post-cured at a temperature greater than or equal to 700° C.

The post-curing temperature indicates that the melting temperature of the matrix is well above 700° C. because the resulting matrix is a geopolymer and not an amorphous glass-like structure. The matrix therefore always has a melting temperature higher than the post-curing temperature of the composite manufacture.

Zirconium oxide in the form —ZrO— (optionally ZrOH) and/or —O—Zr—O is found on the surface of nano-spheres of amorphous SiO$_2$ silica (also called nodular amorphous silica), e.g. 2% to 10% by mole of zirconium oxide (ZrO—ZrO$_2$) for one mole of SiO$_2$. The interface between the amorphous nodular SiO$_2$ silica which constitutes the second phase and the said third phase serving as a cross-linking site is the zircono-phosphate bond —Si—O—(P—O—Zr—O—P—O)—Al—O—. Zirconium oxide (ZrO—ZrO$_2$) prevents the formation of a fusible phase caused by the chemical reaction between SiO$_2$ and phosphoric acid. As described below (see Table II), without zirconium bound to silica, an acidic geopolymer having the empirical formula 2SiO$_2$.P$_2$O$_5$, of the acidic poly(phospho-siloxonate) type (—Si—O—P—O—Si—)$_n$ is created, which softens and melts at a temperature ranging from 900° C. to 1000° C. On the opposite, in the context of the present invention, the zircono-phosphate bond —Si—O—(P—O—Zr—O—P—O)-Al-O— is resistant to temperatures higher than 1200° C.

The doping of silica with zirconium is obtained in the vapor phase at a temperature above 2500° C., either by electrofusion or plasma torch. The silica is in a gaseous state and condenses into droplets which give it the name of nodular silica. The physical nature of the zirconium oxide layer obtained after cooling is similar to that of zirconium oxide nanoparticles obtained by sol-gel. It is a layer that exhibits surface features at the nanoscale, as described in the article "Size-dependent density of zirconia nanoparticles", Agnieszka Opalinska et al, Beilstein J. Nanotechnol. (2015), 6, 27-35.

One of these features is the presence of the —Zr—OH group, which forms on the surface during cooling in air. The chemical reactivity of this surface is therefore very high, much higher than that of ZrO$_2$ zirconia manufactured industrially by electrofusion. In the presence of phosphoric acid $H_3PO_4$, acid zirconium phosphate $Zr(HPO_4)_2.H_2O$ is formed which will react with, on the one hand, the nodular amorphous silica $SiO_2$ and, on the other hand, the alumina hydroxide $Al(OH)_3$. Thus, after dehydroxylation and post-curing at 700° C., the zircono-phosphate bond is obtained, which is written —Si—O—(P—O—Zr—O—P—O)-Al-O— according to geopolymer terminology. This zircono-phosphate (ZrP) bond of the third phase can also be quantified by the molar ratio "z" as described above.

However, if the amount of zirconium atom dopant Zr is low, with the above-mentioned molar ratio "z" having a value of less than 0.025, the crosslinking site is predominantly of the poly(phospho-sialate), —Si—O—(P—O—Si—O-Al-) type and the melting temperature of the composite is not significantly increased compared to the melting temperature of the polymer of formula 1.

The occurrence of Zr—OH groups can be quantitatively measured in the nodular amorphous silica doped with zirconium oxide ($ZrO$—$ZrO_2$). One only has to take into account, in the analysis of the oxides, the part devoted to the loss of ignition (LOI) which is, in general, between 1% and 2.5% by weight.

With regard to the textile, it is not limited according to the invention; it can be a silica textile of the Quartzel® type (Saint-Gobain Quartz), a textile of alumina or aluminosilicate fibers (Hiltex ALF®, marketed by Hiltex, or Nextel® marketed by 3M), a textile containing or consisting of silicon carbide fibers (Nicalon® Ceramic Fibers marketed by COI Ceramics, Tyranno® Fibers marketed by UBE Industries) or a textile containing or consisting of carbon fibers (Torayca® marketed by Toray, Toho® Tenax marketed by Teijin). The textile can be unidirectional; it can also be a fabric, such as satin, twill, taffeta, or felt, for example. The textile fibers can be de-sized and/or covered with a continuous interphase of type C (carbon) or BN (boron nitride). This interphase, or coating, can be applied by CVD (Chemical Vapor Deposition) or by dipping in a solution and then pyrolysis. These same textiles can be used in the composite material of the invention. These fabrics are used in the following examples.

According to a preparation method that gives specific beneficial results, the amorphous nodular $SiO_2$ silica comprises on its surface 2% to 10% by mole of zirconium, in particular in the form —Zr—OH for one mole of $SiO_2$.

The above-mentioned silica has an average diameter less than or equal to 5 microns and preferably less than 2 microns (average size obtained by sieving) in order to be able to interfere between and within the fibers of the textile.

DETAILED DESCRIPTION OF THE EMBODIMENTS

The present invention, its characteristics and the various advantages that it provides will become clearer upon reading the following description, which refers to the following examples, which are provided for illustration and without any limitation.

EXAMPLES

Comparative Example 1

Comparison of a Composite According to the Invention with a Composite as Described in Example 1 of Document WO 96/28398 and a Composite Obtained by the Sintering Technique Described in the Publication of Xue-Jin Yang et al. In 2015

A composite material is prepared according to the invention comprising a carbon fiber fabric and a matrix as indicated in Example 4 below. Another composite material is prepared in accordance with Example 1 of WO 96/28398 and another material is prepared as described in the 2015 publication of Xue-Jin Yang et al. One compares the behavior of these two composites as follows. The composites are heated to 600° C. for a period of 1 to 6 hours. The residual mass of the fibers is then calculated from the loss of the weight of the matrices alone as a function of time. The results are summarized in Table 1.

TABLE I

| Time in hours | WO 96/28398 | Present invention | Xue-Jin Yang |
|---|---|---|---|
| 0 | 0% | 0% | 0% |
| 1 | 9% | 3% | 1-3% |
| 3 | 25% | 4% | — |
| 6 | 34% | 6% | — |

It can be seen from the results in Table 1 that the acidic poly(phospho-sialate) matrix (—P—O—Si—O—Al—O—)$_n$, prepared according to the present invention, greatly limits the oxidation of carbon fibers, compared to a poly(sialate) alkaline matrix.

Comparative Example 2: Preparation of a Poly(Phospho-Siloxonate) Matrix

A resin is therefore prepared to produce a geopolymer by mixing silica fume and an aqueous solution of phosphoric acid $H_3PO_4$ at 75% (mass concentration). The resin is poured into a mold and then cured at 250° C. The thermal evolution of this poly(phospho-siloxonate) is then monitored with a scanning electron microscope (SEM) after curing at 250° C., 700° C. and 1000° C. The results are presented in Table II below.

TABLE 2

| 250° C. | 700° C. | 1000° C. |
|---|---|---|
| Strong presence of $SiO_2$ nanospheres of all dimensions. | the $SiO_2$ nanospheres, of dimensions >2 microns have disappeared | the matrix is molten; it is a glass; zero nanosphere of $SiO_2$ |

It is noted that the geopolymerization reaction takes place between 250° C. and 700° C., but that the poly(phospho-siloxonate) (—Si—O—P—O—Si—)$_n$ geopolymer softens and melts at a temperature below 1000° C. In fact, if one refers to the phase diagrams, one notices that in the $SiO_2$—$P_2O_5$ system, there exists an eutectic at 980° C. corresponding to the empirical chemical formula $2SiO_2.P_2O_5$ (see Phase Diagrams For Ceramists, FIG. 364, American Ceramic Society, 1964). It cannot therefore be used as a matrix for thermostable thermostructural composite materials, such as those developed in the present invention, because of its relatively low softening temperature.

Comparative Example 3: Fiber Composite Comprising a Matrix Consisting of Poly(Alumino-Phosphate) (—Al—O—P—O—)$_n$ An alumina hydrate $Al(OH)_3$ with a particle size of less than 10 microns is selected and reacted with a 75% aqueous solution of phosphoric acid $H_3PO_4$ (mass concentration). Then a textile is impregnated with the resin thus obtained. The fabric is made of alumina fibers (Nextel fibers from the company 3M). The whole is cured in an autoclave using well-known technologies applied to organic matrix composites or alkaline geopolymer composites. The prior art teaches us that the geopolymerization temperature of poly(aluminophosphate) $AlPO_4$ is above 118° C., and the examples described in the above-mentioned textbook indicate temperatures of 113° C., 123° C. and 133° C. Then a 700° C. heat post-treatment is carried out. This produces a solid composite material. Next, samples are cut in the fiber direction of the textile in order to carry out mechanical tests. These samples are used to determine the 3-point bending strength at room temperature and also at 800° C., according to ASTM C1341-06, and tensile strength, according to ASTM C1275. The results are presented in Table 3.

TABLE III

|  | Ambient Temperature | at 800° C. |
|---|---|---|
| 3-point bending strength (MPa) | 118 | 106 |
| Tensile strength (MPa) | 109 | 82 |

From the results in Table III, it can be seen that the values are lower than those of prior art composite materials obtained with an alkaline poly(sialate) matrix, which are in the range of 200 MPa to 350 MPa at room temperature. These values are also much lower than those required by the industry for this type of thermostructural composite.

Throughout the application, oxide ratios are mole ratios, and indicated parts are by weight.

EXAMPLES OF IMPLEMENTATION OF THE PRESENT INVENTION

Example 1

A matrix for composite materials, labeled Nr51, is prepared using a reaction mixture containing: $H_2O$: 5.30 moles; $P_2O_5$: 0.56 moles; $SiO_2$ doped with zirconium oxide: 1.78 moles; $Al_2O_3$: 1 mole.

$Al_2O_3$ comes from an aluminum hydroxide $Al(OH)_3$ powder; $SiO_2$ comes from amorphous nodular silica prepared by electrofusion and doped with 2% by weight of $ZrO_2$, $P_2O_5$ comes from an aqueous solution of phosphoric acid at 75% mass concentration. The molar ratio of the reactive oxides is equal to:

| $P_2O_5/SiO_2$ | 0.31 |
|---|---|
| $SiO_2/Al_2O_3$ | 1.78 |
| $P_2O_5/Al_2O_3$ | 0.56 |

The mixture is left to mature for 1 to 2 hours, then cured at 120° C. in a closed mold and removed from the mold and dried at 250° C. for 3 hours. The sample is then heat-treated in an air oven at 700° C. for 3 hours.

Usually, to determine the mineralogical nature and composition of a ceramic-type material, the worker in the field uses X-ray diffraction analysis. The applicant has made a number of X-ray diffraction diagrams on the matrices described in the examples of the present invention. Unfortunately, they are useless. Actually, for the ternary system $SiO_2/P_2O_5/Al_2O_3$, which is the case of the present invention, it is impossible to differentiate between a quartz type silica from an alumina phosphate of berlinite type, a trydimite type silica from a trydimite type alumina phosphate, a cristobalite type silica from a cristobalite type alumina phosphate. Indeed, it is well known by the workers in the field that these various types of silica have the same molecular structure, an isostructural phenomenon, as the various types of alumina phosphate. They exactly have the same X-ray diffraction pattern. To overcome this difficulty, the applicant chose the scanning electron microscopy SEM, ×3000 magnification, coupled with EDS analysis. The results are presented in Table 4 below with EDS analysis carried out on 3 points.

Point "A" is pointed on a nodular silica with a size of 3 microns, point "B" in an amorphous zone which contains a handful of silica spheres with a diameter of 500 nm to 1 micron, point "C" in an amorphous zone with no visible sphere at this stage of the SEM magnification.

Table IV: SEM EDS analysis, atomic composition percent in the nano-composite, sample Nr51.

TABLE IV

| Elements | Point A | Point B | Point C |
|---|---|---|---|
| Al | 10.48 | 44.92 | 52.25 |
| Si | 76.46 | 27.25 | 19.10 |
| P | 9.11 | 26.81 | 28.02 |
| Zr | 3.95 | 1.48 | 0.23 |

Point "A" shows the nodular silica sphere covered by the zircono-phosphate cross-linking phase —Si—O—(P—O—Zr—O—P—O)—Al-O—. Point "B" corresponds to the first polymeric phase which after computation contains approximately: 1 mole of zircono-phosphate (P—O—Zr—O—P—O)—, 25 moles of poly(phospho-sialate) (—P—O—Si—O—Al—O—), 9 moles of unreacted $Al_2O_3$ and 1 mole of silica $SiO_2$ (small spheres of 500 nm). For point "C" the breakdown is as follows: 19 moles of poly(phospho-sialate) (—P—O—Si—O—Al—O—), 12 moles of $Al_2O_3$ and 9 moles of $AlPO_4$ poly(alumino-phosphate) (Al-O—P—O—).

Example 2

A new acidic geopolymer matrix (Nr50) is prepared as in Example 1, but with a reaction mixture containing: $H_2O$: 3.50 moles; $P_2O_5$: 0.37 moles; $SiO_2$: 1.18 moles; $Al_2O_3$: 1 mole; $Al_2O_3$ comes from an alumina hydroxide $Al(OH)_3$ powder; $SiO_2$ comes from amorphous nodular silica prepared by electrofusion and doped with 2% by weight of $ZrO_2$; $P_2O_5$ comes from a solution of phosphoric acid at 75% concentration in water. The molar ratio of the reactive oxides is equal to:

| $P_2O_5/SiO_2$ | 0.31 |
|---|---|
| $SiO_2/Al_2O_3$ | 1.18 |
| $P_2O_5/Al_2O_3$ | 0.37 |

The results of the EDS-SEM analysis are listed in Table 5 below with EDS analysis conducted on 3 points: point "A" is pointed on a nodular silica with a 2-micron size, point "B" corresponds to an amorphous zone which contains a handful of silica spheres with a diameter of 500 nm to 1 micron, point "C" is an amorphous zone with a handful of spheres visible at this stage of SEM magnification.

Table V: SEM EDS analysis, atomic composition percent in the nano-composite, sample Nr50.

TABLE V

| Elements | Point A | Point B | Point C |
|---|---|---|---|
| Al | 15.02 | 49.25 | 45.26 |
| Si | 69.16 | 31.73 | 36.40 |
| P | 11.09 | 18.79 | 18.05 |
| Zr | 4.31 | 0 | 0 |

In sample Nr50, point "A" shows the nodular silica sphere covered by the zircono-phosphate cross-linking phase —Si—O—(P—O—Zr—O—P—O)—Al—O—. Point "B" corresponds to the first polymeric phase which after computation contains approximately: 18 moles of poly(phospho-sialate) (—P—O—Si—O—Al—O—), 13 moles of silica $SiO_2$ (silica nano-spheres) and 9 moles of unreacted $Al_2O_3$. For point "C" the breakdown is as follows: 18 moles of poly(phospho-sialate) (—P—O—Si—O—Al—O—)+18 moles $SiO_2$+5.5 moles of $Al_2O_3$.

In these two matrices Nr51 and Nr50, the first polymeric phase of the nano-composite constituting the geopolymer matrix essentially comprises poly(phospho-sialate) (—P—O—Si—O—Al—O—), 18 to 25 moles, with 5 to 12 moles of a micronized $Al_2O_3$ filler, and 0 to 9 moles of poly (alumino-phosphate) (Al-O—P—O—), $AlPO_4$. It should be noted that poly(alumino-phosphate) (Al-O—P—O—), $AlPO_4$, is not the main component of the polymeric phase of this acidic geopolymer, the predominant component is poly (phospho-sialate) (—P— O—Si—O—Al—O—).

Example 3

A new acidic geopolymer matrix (Nr13) is manufactured as in Examples 1 and 2, but with a reaction mixture containing: $H_2O$: 3.50 moles; $P_2O_5$: 0.37 moles; $SiO_2$: 2.02 moles; $Al_2O_3$: 1 mole.

$Al_2O_3$ comes from an alumina hydroxide $Al(OH)_3$ powder); $SiO_2$ comes from amorphous nodular silica prepared by electrofusion and doped with 4% by weight of $ZrO_2$, $P_2O_5$ comes from a solution of phosphoric acid at 75% concentration in water. The molar ratio of the reactive oxides is equal to:

| | |
|---|---|
| $P_2O_5/SiO_2$ | 0.18 |
| $SiO_2/Al_2O_3$ | 2.028 |
| $P_2O_5/Al_2O_3$ | 0.37 |

This Nr13 matrix is used for the making of a fiber-reinforced composite material. The above-mentioned reaction mixture is used to impregnate a satin-type fabric made of fibers containing more than 99% by mass of alumina (Nextel® Fabric 610 marketed by the company 3M). Six pieces of the obtained impregnated fabric are superimposed on a flat support, alternating the warp and weft directions of the fabric. The laminated composite thus obtained and its support is placed in a vacuum bag. Once the vacuum is created (pressure less than or equal to 100 mbar in absolute), the whole unit is placed in an autoclave under a pressure of 6 bars, at 150° C. (first cure). After having left the unit for 6 hours in the above-mentioned vacuum and temperature conditions, the composite is removed from the mold and subjected to a 3-hour postcuring at 700° C. Then, samples are cut in the direction of the fibers of the textile in order to perform mechanical tests. The results of these tests are summarized in Table 6 below.

These samples are used to determine the 3-point bending strength at room temperature and 800° C., according to ASTM C1341-06 and the tensile strength, according to ASTM C1275. The results obtained for the composite specimens of Example 3 are listed in Table 6 below.

TABLE VI

| | Ambient Temperature | at 800° C. |
|---|---|---|
| 3-point bending strength (MPa) | 339 | 255 |
| Tensile strength (MPa) | 214 | 170 |

Example 4

Composite plate samples are prepared as in Example 3. They are exposed to a temperature of 1000° C. or 1200° C. for 100 hours. The samples are then allowed to return to room temperature before measuring their flexural strength. The mass loss is also measured to determine whether the fibers have been degraded. The results are summarized in Table 7 below.

Table VII: Thermal ageing results for the composite material from example 4; flexural strength (MPa), modulus GPa and residual mass in %.

TABLE VII

| | number of samples | Flexural strength (MPa) | Modulus (GPa) | Residual mass |
|---|---|---|---|---|
| Initial state | 3 | 356 | 73 | 100 |
| After thermal aging 100 hours at 1000° C. | 3 | 317 | 71 | 99.7 |
| After thermal aging 100 hours at 1200° C. | 3 | 166 | 80 | 98.8 |

It can be seen from the results in Table 7 that the flexural strength decreases only moderately (10.9% from the initial state) with ageing at 1000° C. If we refer to Table 2, which shows the melting of the poly(phospho-siloxonate) geopolymer (—Si—O—P—O—Si)$_n$ between 900° C. and 1000° C., we can see that the zirconium oxide (ZrO—$ZrO_2$) doping has fulfilled its function since the strength is practically unchanged at 1000° C. This strength decreases with aging at 1200° C., but remains sufficiently high, much higher than the composite materials of the prior art, such as the one described above in Table 3. The modulus remains almost constant. The composite has lost less than 2% of mass whatever the temperature of ageing.

Any worker in the field will easily understand the benefits to be gained from the manufacturing method of fiber-reinforced composite materials based on an acidic poly (phospho-sialate) geopolymer matrix, more specifically when comparing the thermal properties of materials containing Nextel type alumina fiber. He will also note the benefits of the present invention for carbon-based Cf/SiC composites. In fact, it can be seen from the results in Table 1 that the acidic poly(phospho-sialate) matrix (—P—O—Si—O—Al—O—)$_n$, according to the present invention, significantly minimizes the oxidation of carbon fibers, compared to an alkaline poly(sialate) matrix. The economic benefits of the method according to the invention are therefore obvious. Of course, this geopolymer matrix can also be used with all the other fibrous reinforcements known by the worker in the field as well as with many other reinforcements that allow the manufacture of composite materials. One can mention for example mica flakes and similar particulates designed to fabricate materials stable at high temperatures.

The worker in the field may also add to the reaction mixtures any extra mineral or organic material known for its capacity to increase the impregnation and/or reduce the amount of air trapped in the matrix. Various modifications may thus be introduced by the worker in the field to the acid geopolymeric matrix and to the method which has just been described simply as an example, whilst staying within the terms of the invention.

The invention claimed is:

1. A composite material containing a matrix and a fibrous reinforcement, said matrix comprising a geopolymer of a poly(phospho-sialate) having a following empirical formula:

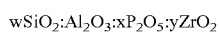

with $1.00 \leq w \leq 3.00$, $0.20 \leq x \leq 2.00$ and $0.02 \leq y \leq 0.03$; and
wherein said geopolymer matrix has a melting temperature greater than 700° C.

2. The composite material of claim 1, wherein the fibrous reinforcement is a textile embedded in said geopolymer matrix.

3. The composite material of claim 1, wherein the melting temperature is equal to or greater than 1200° C.

4. The composite material of claim 1, wherein said geopolymer matrix comprises a nanocomposite comprising three phases:
   a) a first polymeric phase comprising an acidic poly(phospho-sialate) geopolymer of formula (—P—O—Si—O—Al—O—)$_n$ in which n is greater than 2 and a micronized filler of $Al_2O_3$;
   b) a second nodular phase consisting of nano spheres of amorphous $SiO_2$ silica having a diameter of less than 2 microns; and
   c) a third phase comprising units of formula —Si—O—(P—O—Zr—O—P—O)—Al—O—[[Si—O—(P—O—Zr—O—P—O)—Al—O—]] and units of formula —P—O—Si—O—Al—O—)[[—Si—O—(P—O—Si—O—Al—)]] and serving as a cross-linking site between said first polymeric phase and said second nodular phase.

5. The composite material of claim 4, wherein the diameter of said amorphous $SiO_2$ silica is less than 500 nm.

6. The composite material of claim 1, wherein said geopolymer further comprises at least one of a berlinite poly(alumino-phosphate) (Al-O—P—O—)[[ (Al-O—P—O—)]] geopolymer of empirical formula Al[[I]] $PO_4$ [[$AlPO_4$]] and a cristobalite poly(alumino-phosphate) (Al-O—P—O—)[[ (Al-O—P—O—)]] geopolymer of empirical formula $AlPO_4$ [[$AlPO_4$]].

7. The composite material of claim 4, wherein said geopolymer matrix further comprises zirconium phosphate (P—O—Zr—O—P—O)— in said first polymeric phase.

8. The composite material of claim 4, wherein a molar fraction (z/a number of moles of $SiO_2$ in said geopolymer matrix) is greater than or equal to 0.025 and less than or equal to 0.3, z being a number of moles of zirconium phosphates present in said third phase.

9. The composite material of claim 8, wherein the molar fraction (z/the number of moles of $SiO_2$ in said geopolymer matrix) is equal to y.

10. The composite material of claim 4, wherein a molar fraction (z / the number of moles of $SiO_2$ in said geopolymer matrix) is less than 0.025, z being a number of moles of zirconium phosphates present in said third phase; and wherein said third phase contains more units of the formula —Si—O—(P—O—Si—O—P—O)—Al-O— than units of the formula —Si—O—(P—O—Zr—O—P—O)—Al-O—[[—Si—O—(P—O—Zr—O—P—O)—Al—O—]].

11. The composite material of claim 1, wherein said fibrous reinforcement is a textile comprising fibers selected among aluminosilicate fibers, alumina fibers, glass fibers, silica fibers, silicon carbide fibers, carbon fibers, graphite fibers and mixtures of at least two of the fibers.

12. The composite material of claim 4, wherein the diameter of the nano spheres of amorphous $SiO_2$ silica is less than 500 nm.

13. A method of manufacturing a fiber-reinforced composite material of claim 1, comprising:
   preparing a resin by mixing, at a temperature substantially equal to 20° C., phosphoric acid $H_3PO_4$, alumina hydroxide $Al(OH)_3$, amorphous nodular silica $SiO_2$ comprising on its surface zirconium oxide and water $H_2O$, in a following molar ratios:
   $P_2O_5/SiO_2$ greater than or equal to 0.20 and less than or equal to 0.66;
   $SiO_2/Al_2O_3$ greater than or equal to 1.0 and less than or equal to 3.0;
   $P_2O_5/Al_2O_3$ greater than or equal to 0.20 and less than or equal to 2.0; and leaving an obtained mixture to stand for 1 to 2 hours;
   impregnating a textile with the resin, the textile comprising fibers selected among aluminosilicate fibers, alumina fibers, glass fibers, silica fibers, silicon carbide fibers, carbon fibers, graphite fibers and mixtures of at least two of the fibers;
   preparing a composite material by curing the textile impregnated with the resin at a temperature above 80° C. in an autoclave and under vacuum; and
   post-curing the composite material at a temperature greater than or equal to 100° C.

14. The manufacturing method of claim 13, wherein said zirconium oxide is in a form of at least one of —ZrO— and —Zr—OH.

15. The manufacturing method of claim 13, wherein the textile impregnated with the resin is cured at a temperature above 118° C. and below 260° C.

16. The manufacturing method of claim 13, wherein the amorphous nodular silica $SiO_2$ has on its surface 2% to 10% by mole of zirconium in a form of at least one of —Zr—O— and —Zr—OH.

* * * * *